US 9,876,348 B2

(12) United States Patent
Rahman et al.

(10) Patent No.: US 9,876,348 B2
(45) Date of Patent: Jan. 23, 2018

(54) IN-LINE CABLE TERMINATION SYSTEMS FOR ELECTRICAL POWER TRANSMISSION CABLES AND METHODS USING THE SAME

(71) Applicant: Tyco Electronics Canada ULC, Markham (CA)

(72) Inventors: Sarzil Rahman, Scarborough (CA); Barry James Johnson, Vaughan (CA); Edgar Cachia, Newmarket (CA)

(73) Assignee: TE Connectivity Corporation, Berwyn, PA (US)

( * ) Notice: Subject to any disclaimer, the term of this patent is extended or adjusted under 35 U.S.C. 154(b) by 693 days.

(21) Appl. No.: 14/478,506

(22) Filed: Sep. 5, 2014

(65) Prior Publication Data

US 2016/0072277 A1     Mar. 10, 2016

(51) Int. Cl.
*H02H 7/22* (2006.01)
*H01R 43/20* (2006.01)
(Continued)

(52) U.S. Cl.
CPC .......... *H02H 7/226* (2013.01); *H01H 31/006* (2013.01); *H01H 31/125* (2013.01);
(Continued)

(58) Field of Classification Search
CPC .......... H02H 7/226; H02H 3/08; H01R 43/20; H01H 31/006; H01H 31/125; H01H 31/127

See application file for complete search history.

(56) References Cited

U.S. PATENT DOCUMENTS

| | | | |
|---|---|---|---|
| 3,670,372 A | 6/1972 | Crosby et al. | |
| 3,876,849 A * | 4/1975 | Jackson, Jr. ............. | H01H 3/30 200/16 C |

(Continued)

FOREIGN PATENT DOCUMENTS

| | | |
|---|---|---|
| CA | 2092741 | 5/2004 |
| WO | WO 2008/013891 A2 | 1/2008 |

OTHER PUBLICATIONS

Distribution Connectors Deadends Automatic Copper, HUBBELL® Power Systems, Mar. 2009;35 pages.
(Continued)

*Primary Examiner* — Zeev V Kitov
(74) *Attorney, Agent, or Firm* — Myers Bigel, P.A.

(57) ABSTRACT

An in-line cable termination system for use with first and second electrical power transmission cables includes an isolating apparatus having an isolating apparatus axis and including an electrically conductive first end member and an electrically conductive second end member, first and second insulators, and a fused switch mechanism. The first end member and the second end member are spaced apart along the isolating apparatus axis. Each of the first and second end members includes a respective coupling portion to mechanically and electrically engage the first and second cables, respectively. The first and second insulators each extend between and couple the first end member and the second end member. The fused switch mechanism includes a fuse module and is configured to selectively alternatively electrically connect the first and second end members, and thereby the first and second cables, through the fuse module and disconnect the first and second end members.

23 Claims, 11 Drawing Sheets

(51) Int. Cl.
  *H02H 3/08*  (2006.01)
  *H01H 31/00*  (2006.01)
  *H01H 31/12*  (2006.01)
(52) U.S. Cl.
  CPC ............ *H01R 43/20* (2013.01); *H02H 3/08* (2013.01); *H01H 31/127* (2013.01)

(56) References Cited

U.S. PATENT DOCUMENTS

| | | |
|---|---|---|
| 3,958,089 A | 5/1976 | Anderson |
| 4,183,686 A | 1/1980 | De France |
| 4,814,550 A | 3/1989 | Newberg |
| 5,581,051 A | 12/1996 | Hill |
| 5,942,723 A | 8/1999 | Laricchia |
| 6,851,262 B1 | 2/2005 | Gregory et al. |
| 7,498,528 B2 | 3/2009 | De France |
| 7,766,702 B2 | 8/2010 | De France et al. |
| 8,198,558 B2 | 6/2012 | Gregory et al. |

OTHER PUBLICATIONS

FCI-BurndyA® Products Introduces New Wejtapã,,¢ In-Line Disconnect Switch for Distribution Applications, © 2007-2008 FCI, 1 page, 2007.
Customer Manual, AMPACT* In-Line Disconnect Assemblies 83881-[], 109202-[], 109203[], 109256[], 109257-[], and 109258-[], ©2002 Tyco Electronics Corporation, 4 pages, Jun. 26, 2002.
S&C Electric Company; SMD-20 Power Fuses, Outdoor Distribution (14.4kV through 34.5kV); Descriptive Bulletin 242-32; Oct. 21, 2013; pp. 1-24.
AMPACT In-Line Disconnect Switch (ILD-II) 15kV to 69kV Class; May 2012; 2 pages.
AMPACT In-Line Disconnect Assemblies; Jun. 29, 2010; 4 pages.

* cited by examiner

US 9,876,348 B2

IN-LINE CABLE TERMINATION SYSTEMS FOR ELECTRICAL POWER TRANSMISSION CABLES AND METHODS USING THE SAME

FIELD OF THE INVENTION

The present invention relates to electrical power lines and, more particularly, to cable termination systems for electrical power lines.

BACKGROUND OF THE INVENTION

Electrical cables often must be terminated or joined in various environments, such as underground or overhead. Such cables may be, for example, high voltage electrical distribution or transmission lines. In order to form such connections, a connector may be employed.

In-line isolation devices such as in-line disconnect switches are commonly employed in electrical power transmission lines where it is desired to permanently or selectively isolate a power line such as an overhead power line. Known isolation devices include a pair of end pieces (which may be referred to as dead ends) connected by an elongate insulator. The end pieces are each clamped to a power line using wedge connectors. The power line is then cut between the end pieces so that the isolation device mechanically couples and electrically isolates the two ends of the power line. Examples of devices of this type are disclosed in Canadian Patent No. 2,092,741, U.S. Pat. No. 5,581,051 to Hill, and U.S. Pat. No. 5,942,723 to Laricchia.

SUMMARY OF THE INVENTION

According to embodiments of the present invention, an in-line cable termination system for use with first and second electrical power transmission cables includes an isolating apparatus having an isolating apparatus axis and including an electrically conductive first end member and an electrically conductive second end member, first and second insulators, and a fused switch mechanism. The first end member and the second end member are spaced apart along the isolating apparatus axis. Each of the first and second end members includes a respective coupling portion to mechanically and electrically engage the first and second cables, respectively. The first and second insulators each extend between and couple the first end member and the second end member. The fused switch mechanism includes a fuse module and is configured to selectively alternatively electrically connect the first and second end members, and thereby the first and second cables, through the fuse module and disconnect the first and second end members.

According to further embodiments of the present invention, an in-line cable termination assembly includes first and second electrical power transmission cables and an isolating apparatus. The isolating apparatus has an isolating apparatus axis and includes an electrically conductive first end member and an electrically conductive second end member, first and second insulators, and a fused switch mechanism. The first end member and the second end member are spaced apart along the isolating apparatus axis. Each of the first and second end members includes a respective coupling portion mechanically and electrically engaging the first and second cables, respectively. The first and second insulators each extend between and couple the first end member and the second end member. The fused switch mechanism includes a fuse module and is configured to selectively alternatively electrically connect the first and second end members, and thereby the first and second cables, through the fuse module and disconnect the first and second end members.

According to method embodiments of the present invention, a method for forming a conductor termination assembly with first and second electrical power transmission cables includes providing an isolating apparatus having an isolating apparatus axis and including an electrically conductive first end member and an electrically conductive second end member, first and second insulators, and a fused switch mechanism. The first end member and the second end member are spaced apart along the isolating apparatus axis. Each of the first and second end members includes a respective coupling portion to mechanically and electrically engage the first and second conductor segments, respectively. The first and second insulators each extend between and couple the first end member and the second end member. The fused switch mechanism includes a fuse module and is configured to selectively alternatively electrically connect the first and second end members, and thereby the first and second conductor segments, through the fuse module and disconnect the first and second end members. The method further includes mechanically and electrically securing the coupling portions of the first and second end members to the first and second cables, respectively.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
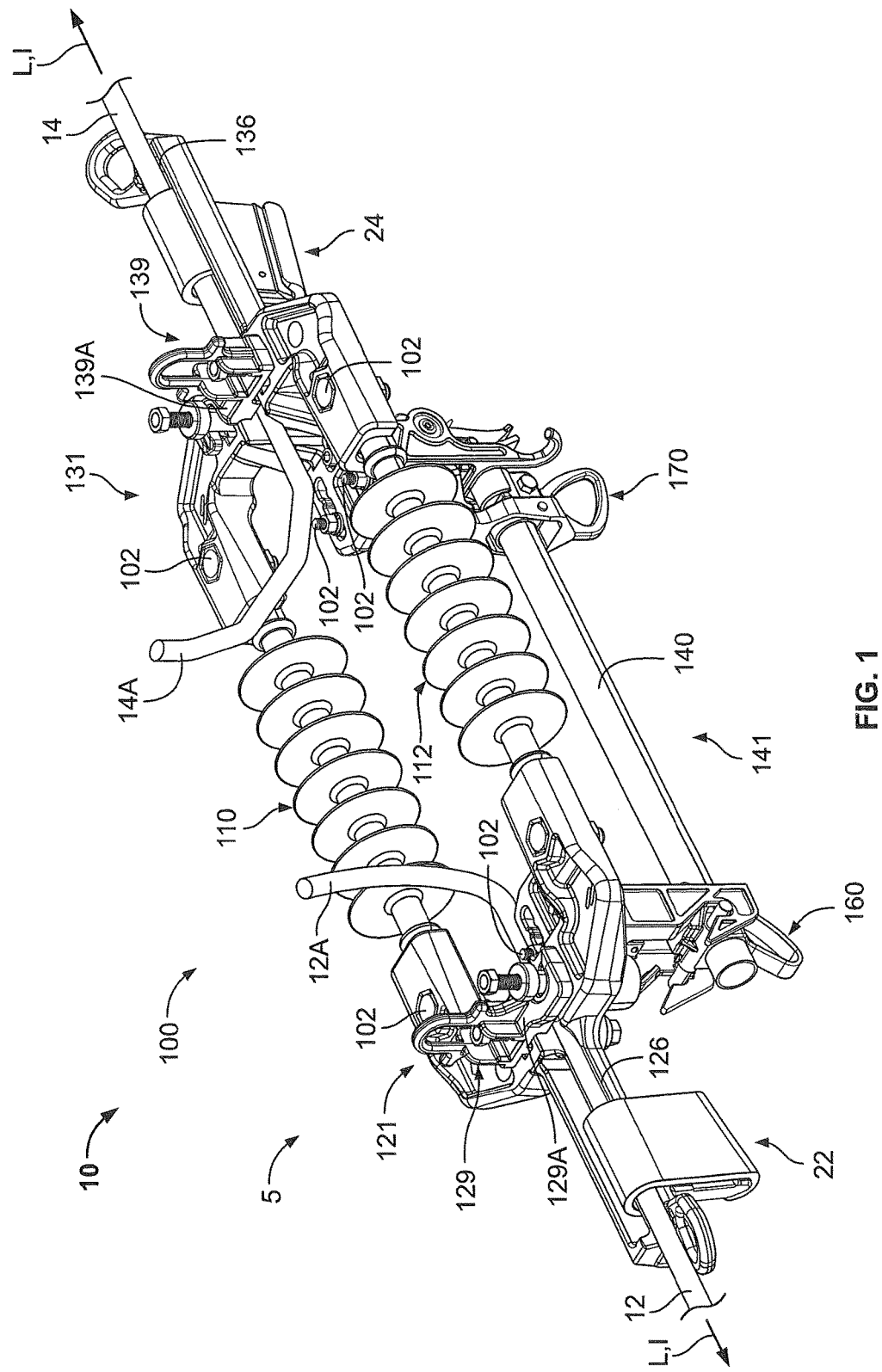
FIG. 1 is a top perspective view of an isolating apparatus according to embodiments of the present invention and a pair of wedge connectors mounted on a power line.

The present invention now will be described more fully hereinafter with reference to the accompanying drawings, in which illustrative embodiments of the invention are shown.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 11:
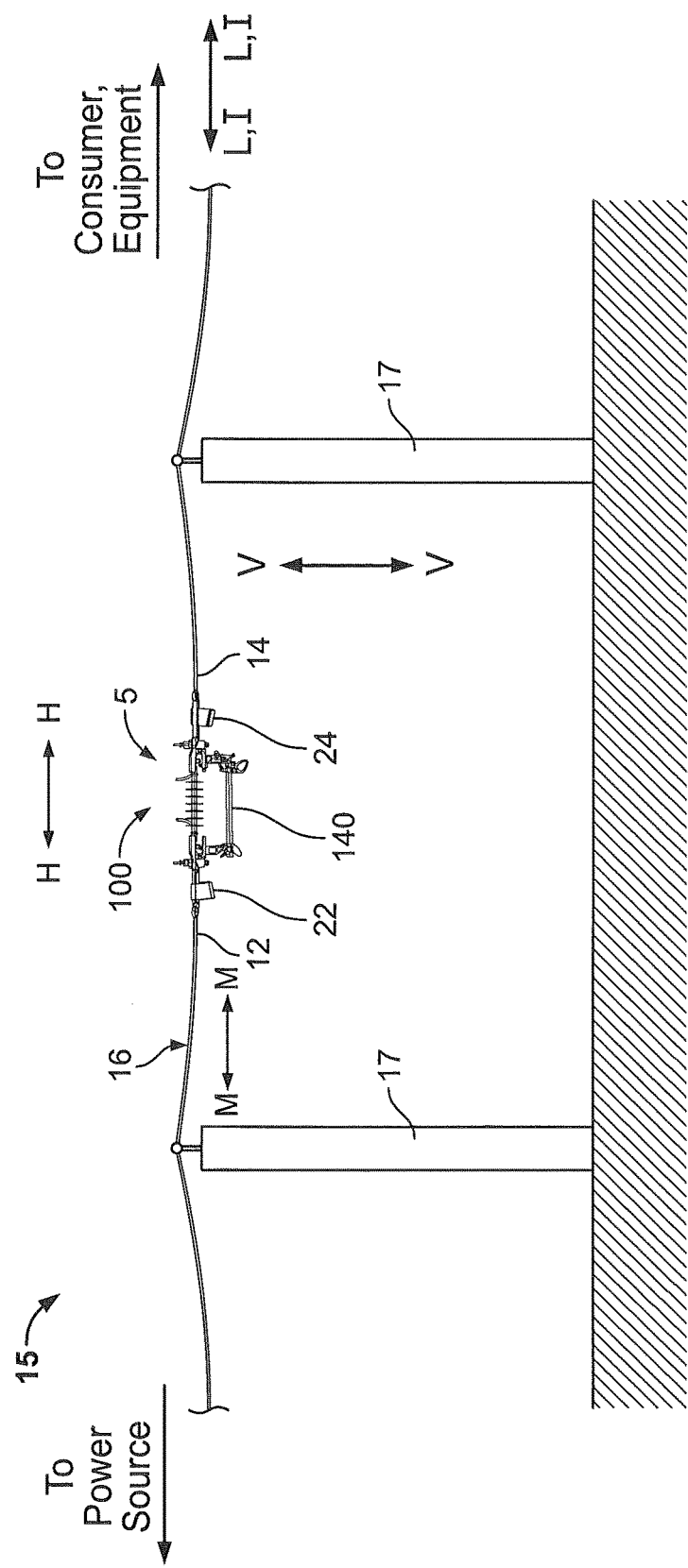
FIG. 11 is a schematic view showing an electrical power distribution line network or installation including the isolating apparatus of FIG. 1.

With reference to the figures, a connector unit or in-line isolating apparatus 100 according to embodiments of the present invention is shown therein. The isolating apparatus 100 may be used with a pair of wedge connectors 22, 24 (FIGS. 1 and 2) (or other suitable connectors) to form an in-line isolation assembly 5 (FIGS. 1, 2 and 11) wherein a pair of elongate power lines or conductor cables 12, 14 are mechanically coupled and electrically isolated by the isolating apparatus 100 and the wedge connectors 22, 24. The isolating apparatus 100 and the wedge connectors 22, 24 together form a cable termination system 10. The isolating apparatus 100 may be referred to as an in-line disconnect device or an in-line switch. The isolating apparatus 100 and the in-line isolation assembly 5 may be incorporated into an electrical power distribution network 15 (FIG. 11).

Figure 2:
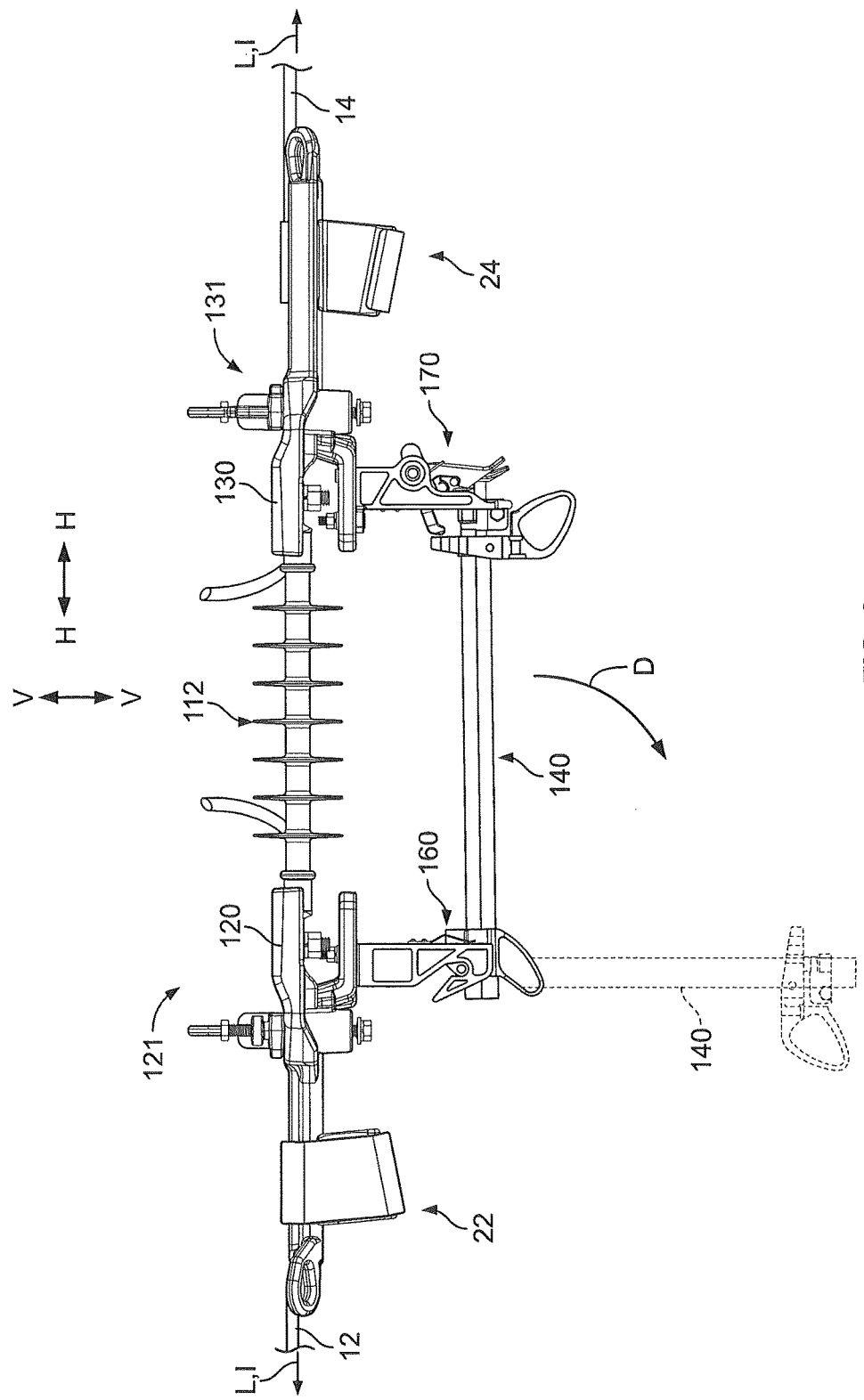
FIG. 2 is a side view of the isolating apparatus of FIG. 1 and the wedge connectors mounted on the power line.

The electrical cables 12, 14 may be formed of any suitable electrically conductive material. In some embodiments and as shown, the cables 12, 14 are bare (i.e., non-insulated) metal electrical conductors. The cables 12, 14 may each include a plurality of separable elongate strands (e.g., helically wound). Alternatively, one or both of the cables 12, 14 may be solid. According to some embodiments, the cables 12, 14 are flexible or bendable. The cables 12, 14 have a cable longitudinal axis I-I (FIGS. 1, 2 and 11). The cables 12, 14 may be initially provided as an integral (mechanically and electrically continuous), elongate power line 16 (FIG. 11) that is severed into the cables 12, 14 as part of the procedure for forming the in-line isolation assembly 5. The power line 16 may likewise have the longitudinal axis I-I.

The isolating apparatus 100 (FIGS. 1 and 2) includes a pair of termination assemblies 121, 131 joined by a pair of insulators 110, 112. The isolating apparatus 100 further includes a fused switch mechanism 141. The isolating apparatus 100 has a lengthwise axis L-L (FIGS. 1, 2 and 11).

Figure 3:
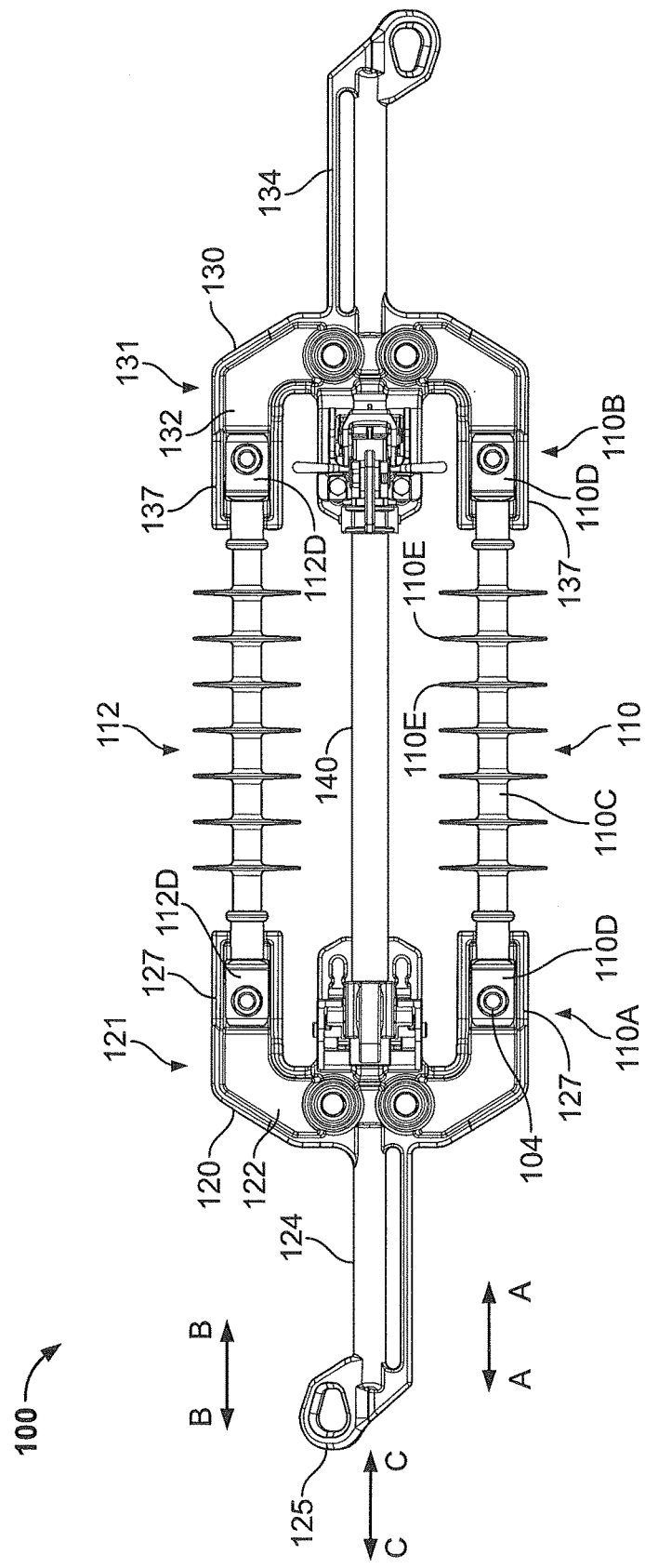
FIG. 3 is a bottom view of the isolating apparatus of FIG. 1.

The insulator 110 is elongate and has opposed ends 110A, 110B and a lengthwise insulator axis A-A (FIG. 3). The insulator 110 includes an electrically insulating body 110C and connector lugs 110D secured to either end of the body 110O (e.g., by crimping). The insulating body 110C may be of any suitable construction. According to some embodiments, the insulating body 110C includes a rigid (e.g., fiberglass) rod surrounded by a rubberized cover. Radially outwardly extending sheds 110E may be provided, which may form a part of the rubberized cover. According to some embodiments, the insulating body 110C is formed of any suitable material, such as aluminum. A fastening hole extends laterally through each lug 110D.

The insulator 112 may be formed in the same manner as described above for the insulator 110 and has a lengthwise axis B-B (FIG. 3).

The end assembly 121 (FIGS. 1-3) includes an end member 120. The end member 120 includes a body or yoke 122 and a coupling portion, shank or rod 124, which may be integrally formed with the yoke 122. A concave, lengthwise extending receiver portion or conductor groove 126 is defined in the coupling rod 124, and a pulling eye 125 is provided on an outer end of the rod 124. The conductor groove 126 defines a longitudinal conductor axis C-C (FIG. 3). The end assembly 121 may optionally further include a retainer mechanism 129 (FIG. 1). The retainer mechanism 129 may be constructed and operable as disclosed in U.S. Pat. No. 8,198,558 to Gregory et al., the disclosure of which is incorporated herein by reference.

The end member 120 may be formed of any suitable material. According to some embodiments, the end member 120 is formed of an electrically conductive metal. According to some embodiments, the end member 120 is formed of aluminum. According to some embodiments, the end member 120 is unitarily cast.

Laterally spaced apart mounting structures 127 are located on the inner end of the yoke 122, and may be integrally formed (e.g., by casting) therewith. A mounting pocket or slot may be defined in each mounting structure 127 to receive the mounting lugs of the insulators 110, 112.

The termination assembly 131 may be constructed in the same manner as the termination assembly 121, and has a retainer mechanism 139, and an end member 130 including a yoke 132, a coupling rod 134, and a conductor groove 136.

The insulators 110, 112 connect and extend between the end members 120, 130 in laterally spaced apart, coextensive, substantially parallel relation. More particularly, the lugs 110D, 112D of the insulators 110, 112 are secured to respective ones of the mounting structures 127, 137 by bolts 102 and nuts 104 (FIGS. 1 and 3). The bolts 102 and nuts 104 may be replaced with other types of fastening components such as rivets. It will be appreciated that other methods may be used to secure the insulators 110, 112 to the end members 120, 130.

Each of the wedge connectors 22, 24 includes a C-shaped member or sleeve 30 and a wedge member 40. As discussed below, a drive tool may be used to force or impel the wedge member 40 and the sleeve 30 into engagement about the cables 12, 14 and the coupling rods 124, 134 to mechanically and electrically couple the cables 12, 14 with the end members 120, 130.

Figure 4:
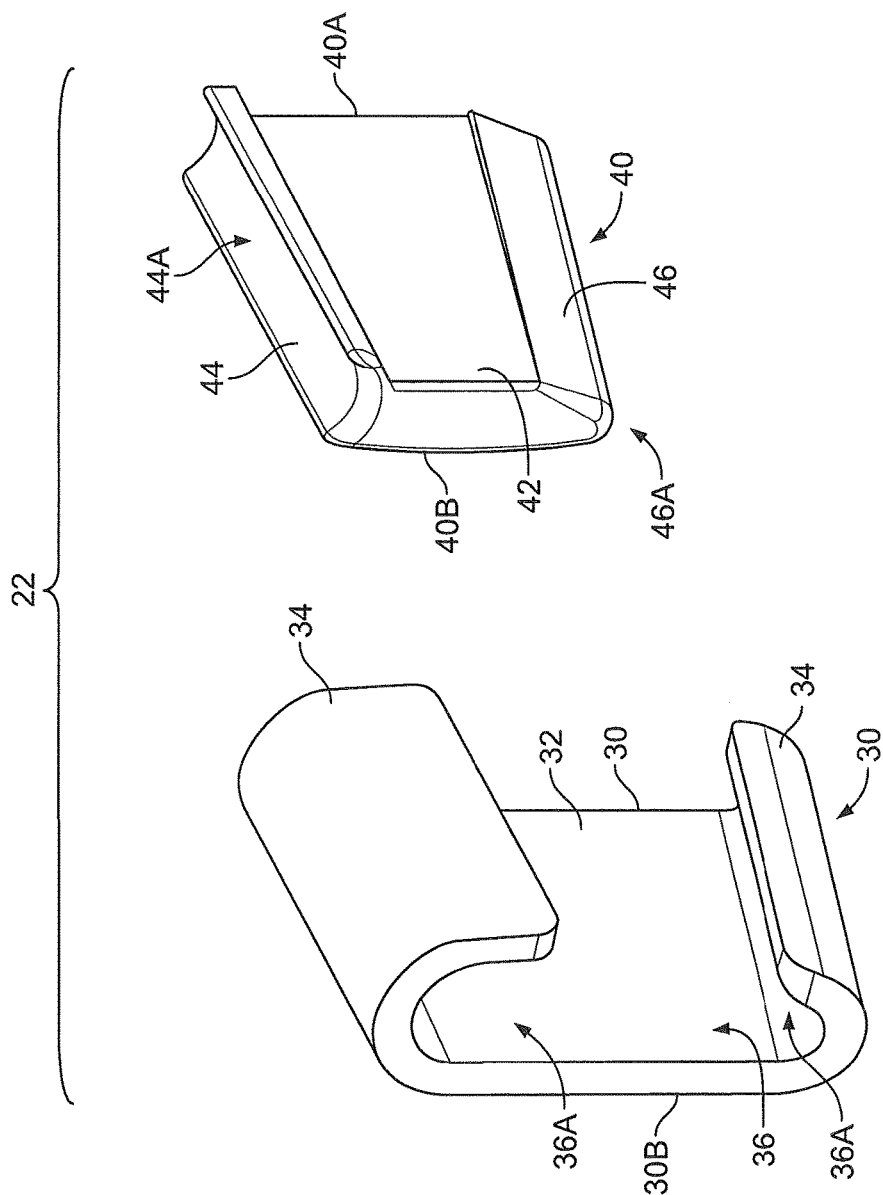
FIG. 4 is an enlarged, exploded view of one of the wedge connectors of FIG. 1.

With reference to FIG. 4, the C-shaped sleeve 30 includes a body 32 and a pair of arcuate side walls 34 extending along the opposed side edges of the body 32. The sleeve 30 defines a cavity 36 including opposed, concave side channels 36A. The sleeve 30 tapers inwardly from a rear end 30A to a front end 30B. More particularly, the side channels 36A taper inwardly or converge from the rear end 30A to the front end 30B.

The C-shaped sleeve 30 may be formed of any suitable material. According to some embodiments, the sleeve 30 is formed of metal. According to some embodiments, the sleeve 30 is formed of aluminum or copper alloy. The sleeve 30 may be formed using any suitable technique. According to some embodiments, the sleeve 30 is stamped (e.g., die-cut), formed, machined and/or cast.

The wedge member 40 includes a body 42 having opposed, arcuate side walls 44, 46. The side wall 44 defines a concave groove or channel 44A. The side wall 46 defines a convex rib or ridge 46A. The wedge member 40 tapers inwardly from a rear end 40A to a front end 40B. The wedge member 40 may be formed of any suitable material. According to some embodiments, the wedge member 40 is formed of metal. According to some embodiments, the wedge member 40 is formed of aluminum or copper alloy. The wedge member 40 may be formed using any suitable technique. According to some embodiments, the wedge member 40 is cast and/or machined.

The C-shaped sleeve 30 and the wedge member 40 may be a C-shaped sleeve and/or a wedge member as sold by Tyco Electronics Corporation of Pennsylvania under the trademark AMPACT™, EXCLTAP™, or MINIWEDGE™. According to some embodiments, the wedge connectors 22, 24 may be constructed and installed as disclosed in U.S. Pat. No. 5,942,723 to Laricchia and/or U.S. Published Patent No. 2007/0240301 (Johnston et al.), for example, the disclosures of which are incorporated herein by reference.

The fused switch mechanism 141 includes a fuse module 140, a hinge assembly 160, and a latch assembly 170.

The hinge assembly 160 includes a bracket body 162 secured to the end member 120 by bolts 102. The bracket body 162 and/or the end member 120 may be provided with longitudinally extending slots or other features to permit axially adjustment of the body 162 relative to the end member 120.

Figure 6:
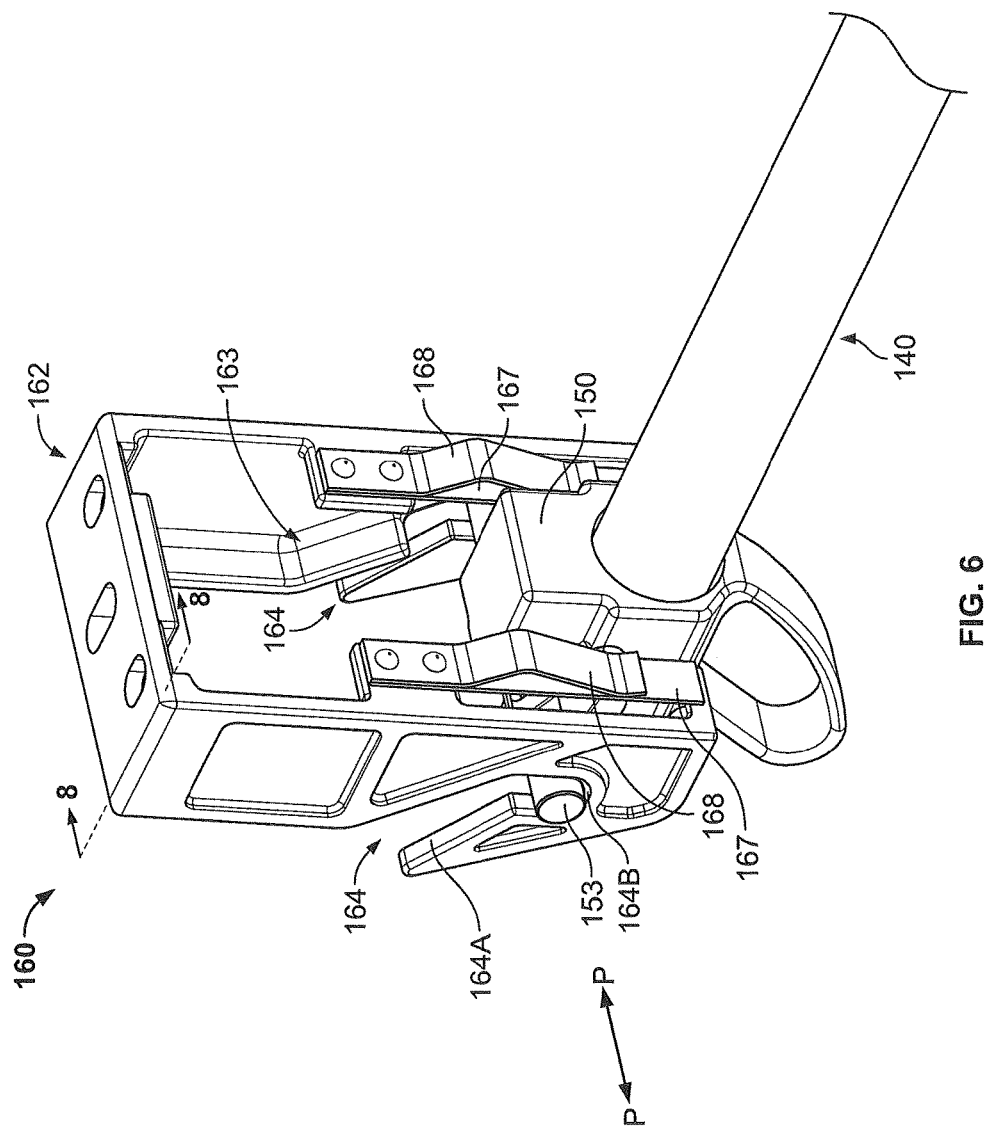
FIG. 6 is a fragmentary, perspective view of the isolating apparatus of FIG. 1 showing a hinge bracket assembly forming a part thereof.
Figure 7:
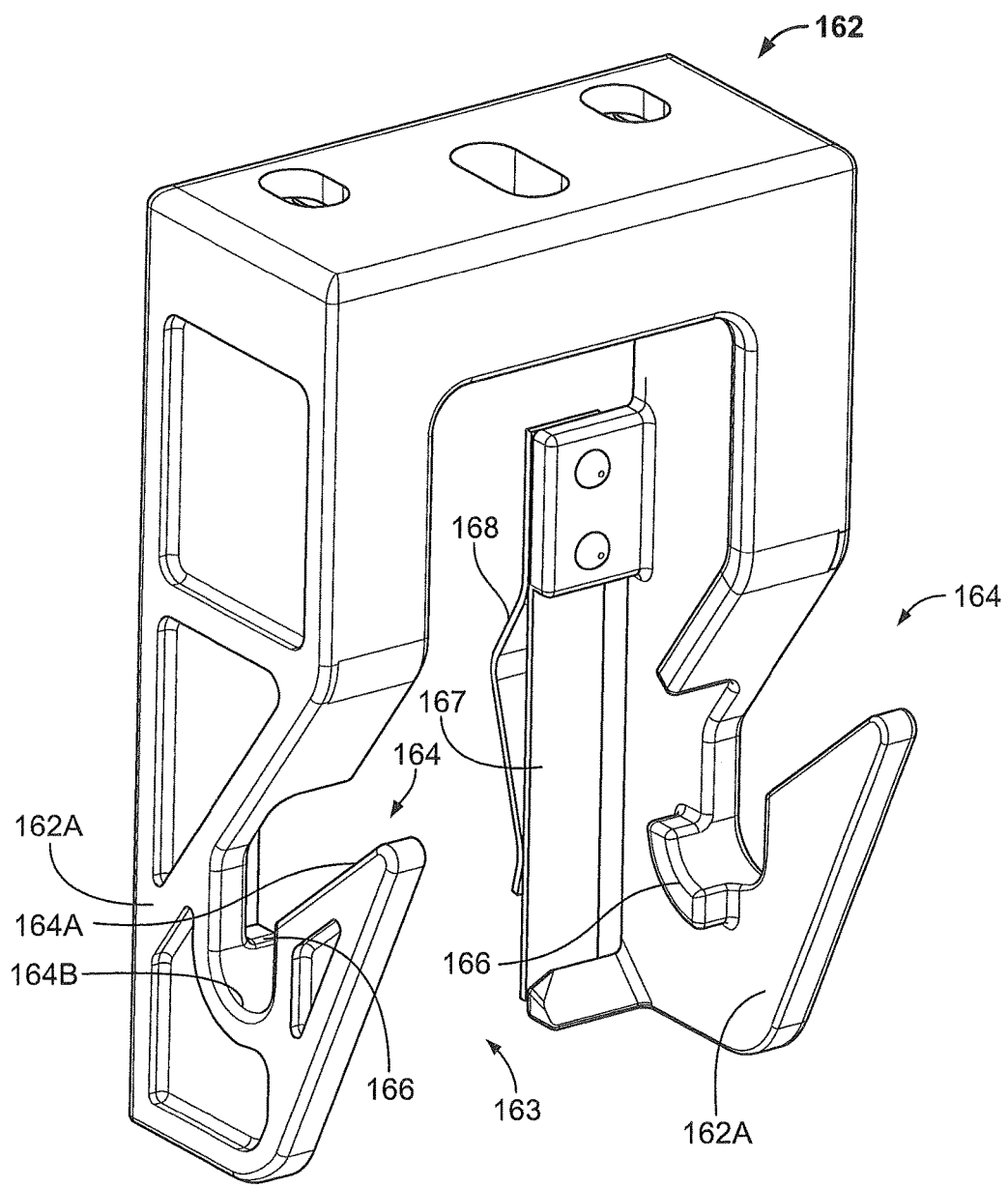
FIG. 7 is a perspective view of a bracket member forming a part of the hinge bracket assembly of FIG. 6.
Figure 8:
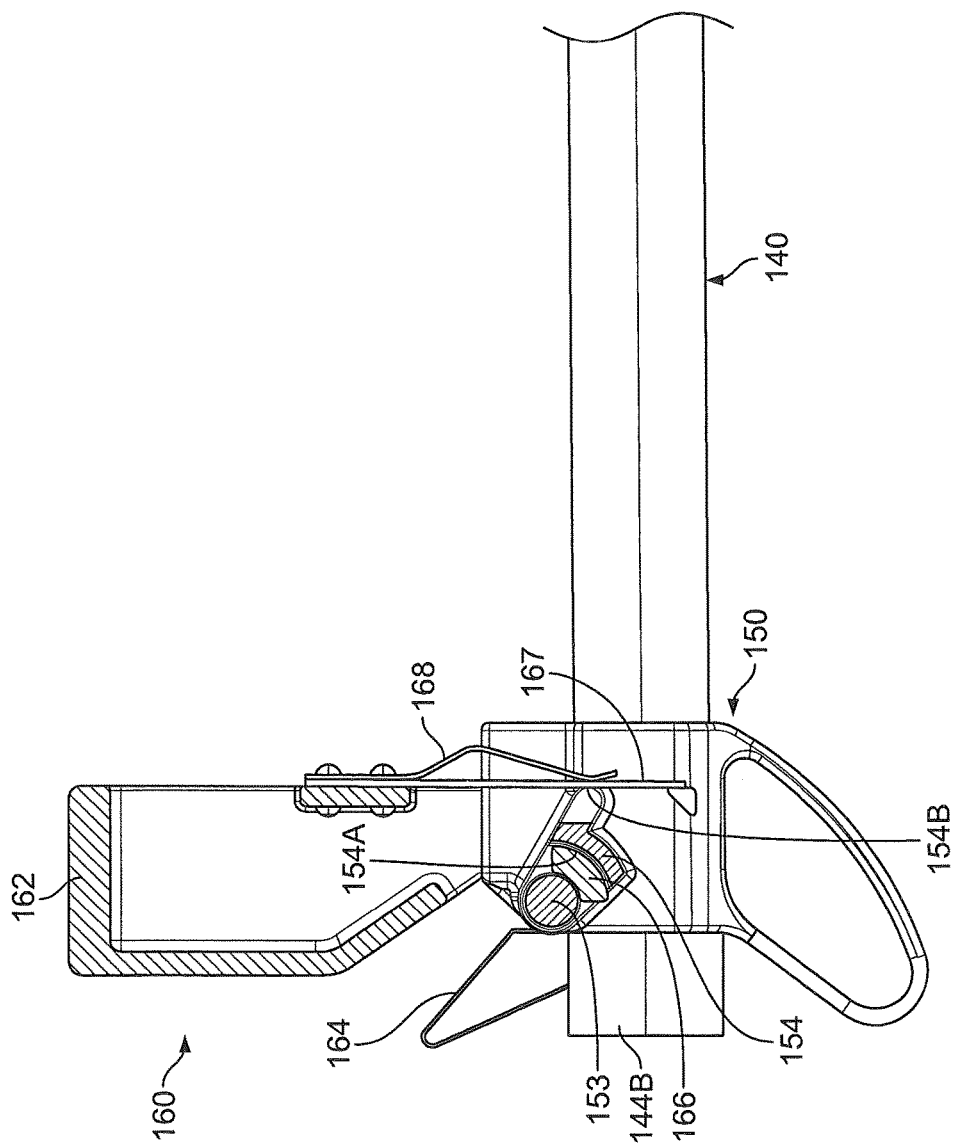
FIG. 8 is a fragmentary, cross-sectional view of the isolating apparatus of FIG. 1 taken along the line 8-8 of FIG. 6.

The bracket body 162 (FIGS. 6-8) is generally inverted U-shaped and defines a central fuse receiver slot 163. Opposed side slots 164 are defined in the side walls or legs 162A of the bracket body 162. Each side slot 164 has a sloped entrance slot section 164A and a concave, generally U-shaped seat section 164B. A pair of opposed, arcuate guide tabs 166 project laterally inwardly from the legs 162A. A pair of contact members or springs 167 are secured to the body 162 at their upper ends and cantilever downwardly. A pair of load springs 168 are similarly secured to the body 162 at their upper ends and cantilever downwardly to brace the contact springs 167.

The bracket body 162 may be formed of any suitable material(s). According to some embodiments, the bracket body 162 is formed of an electrically conductive material and, in some embodiments, an electrically conductive metal such as a copper alloy. The contact springs 167 may be formed of any suitable material(s). According to some embodiments, the contact springs 167 are formed of an electrically conductive material and, in some embodiments, an electrically conductive metal such as a copper alloy. The load springs 168 may be formed of any suitable material(s). According to some embodiments, the load springs 168 are formed of stainless steel.

The latch assembly 170 (FIGS. 9 and 10) includes a bracket body 172 secured to the end member 130 by bolts 102. The bracket body 172 and/or the end member 130 may be provided with longitudinally extending slots or other features to permit axially adjustment of the body 172 relative to the end member 130.

The bracket body 172 is generally inverted U-shaped and defines a central receiver fuse receiver slot 173. The bracket body 172 has integral handle features 172A (e.g., for engagement by a hotstick and/or load break tool).

The latch assembly 170 further includes a latch member 174 including a rear arm 174A and an actuation arm 174B. Arcuate retention slots 174C are defined in laterally opposed sides the actuation arm 174B. The actuation arm 174B has a planar end portion including a strike region 174O. The latch member 174 is pivotably coupled to the bracket body 172 by a pivot pin 179.

The latch assembly also includes a latch biasing spring 175, an electrical contact member or spring 176, and a load spring 178. The contact spring 176 includes a mounting section 176A (secured to the bracket body 172), an intermediate deflection section 176B, and a contact section 176C.

The bracket body 172 may be formed of any suitable material(s). According to some embodiments, the bracket body 172 is formed of an electrically conductive material and, in some embodiments, an electrically conductive metal such as a copper alloy. The contact spring 176 may be formed of any suitable material(s). According to some embodiments, the contact spring 176 is formed of an electrically conductive material and, in some embodiments, an electrically conductive metal such as a copper alloy. The load spring 178 may be formed of any suitable material(s). According to some embodiments, the load spring 178 is formed of stainless steel.

Figure 5:
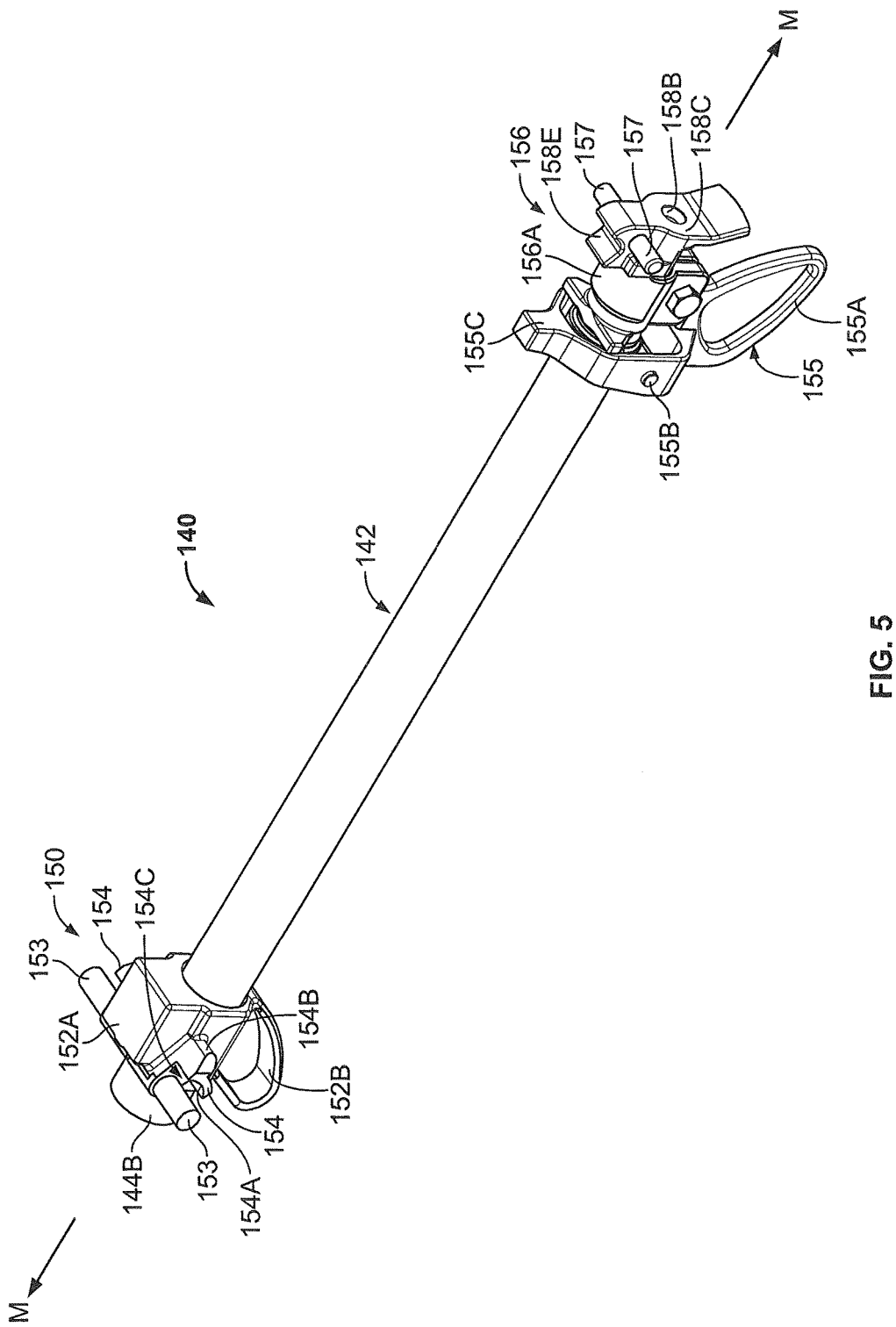
FIG. 5 is a top perspective view of a fuse module forming a part of the isolating apparatus of FIG. 1.

The fuse module 140 (FIGS. 5 and 10) includes a fuse assembly 142, a hinge end fitting 150, and a latch end fitting 156.

The fuse assembly 142 (FIG. 10) includes a tube body 142A defining a bore 142B and an end opening 142C. The end opening 142C is provided with a breakable seal 142D.

A fuse mechanism 144 is disposed in the bore 142B. The fuse mechanism 144 includes a fusible element 144A, and an electrical terminal cap 144B (FIG. 8) and an electrical terminal cap 144C (FIG. 10) electrically connected to opposite ends of the fusible element 144A.

An integral actuator mechanism 146 (FIG. 10) is also disposed in the bore 142B. The actuator mechanism 146 includes a trigger 146A, a drive spring 146B, and a projectile or pin 146C.

The hinge end fitting 150 includes a fitting body 152A and a handle feature 152B (e.g., configured to engage a hotstick). The fitting body 152A electrically and mechanically engages the electrical terminal cap 144B of the fuse assembly 142.

Two pivot posts 153 extend laterally outwardly from opposed sides of the body 152A. A pair of contact projections 154 also extend laterally outwardly from opposed sides of the body 152A forwardly of the pivot posts 153. Each contact projection 154 includes a concave seat surface 154A and an electrical contact surface 154B. A guide slot 154C is defined between each pivot post 153 and its adjacent contact projection 154.

The latch end fitting 156 includes a fitting body 156A and a handle mechanism 155 (e.g., configured to engage a hotstick). The fitting body 156A electrically and mechanically engages the electrical terminal cap 144C of the fuse assembly 142. The handle mechanism 155 includes a handle feature 155A (e.g., configured to engage a hotstick) and an actuator feature 155C and is pivotably coupled to the body 156A by a pivot pin 155B.

Two latch posts 157 extend laterally outwardly from opposed sides of the body 156A. A bore 158A extends axially through the body 156A and terminates in an end opening 158B at an end face 158C. A concave contact seat 158E is defined in the top of the body 156A.

The fuse mechanism 144 is constructed and configured to blow in response to a prescribed overcurrent and/or interrupt current. The fuse mechanism 144 may be a fuse of any suitable type with any suitable operational characteristics or specifications. According to some embodiments, when the fuse mechanism 144 blows, it creates an open circuit between the terminal caps 144B, 144C and also initiates operation of the actuator mechanism 146. According to some embodiments, the fuse mechanism 144 has a normal operating current load rating in the range from 6 to 200 Amps, and a normal operating voltage rating in the range of 15 kV to 35 kV.

According to embodiments of the present invention, the cable termination system 10 may be assembled and used as follows to form the in-line isolation assembly 5. The power line 16 may be an aerial power transmission line, for example. The installation may be executed in whole or in part using hot sticks and/or electrically insulating gloves with the installer working from the ground or a raised platform.

The retainer mechanisms 129 are placed in their open positions as disclosed in U.S. Pat. No. 8,198,558. With the keeper bars 129A, 139A of the retainer mechanisms 129, 139 in the open position, the isolating apparatus 100 is laid on the power line 16 with the grooves 126, 136 facing downwardly and such that the power line 16 extends through the conductor grooves 126, 136 and between the end members 120, 130. The cable 16 is thereby received laterally into the grooves 126, 136.

The keeper bars 129A, 139A are then moved (e.g., by hand or using hotsticks) to their closed positions as shown in FIG. 1 so that they capture the conductor segments of the cable 16 (corresponding to the cables 12, 14) in the grooves 126, 136.

With the keeper bars 129A, 139A in the closed position, the captured conductor segments cannot be removed laterally with respect to the longitudinal axis C-C from the conductor grooves 126, 136. However, in some embodiments, because the keeper bars 129A, 139A are not yet loaded onto the conductor segments or are only loaded by a relatively weak pivot bolt spring, the conductor segments can still be easily rotated and axially displaced with respect to the conductor grooves 126, 136. The isolating apparatus 100 is then rotated 180 degrees about the power line 16 to the upright position as shown in FIG. 1.

The wedge clamps 22, 24 are then installed about the conductor segments and each coupling rod 124, 134 as shown in FIG. 1. The wedge clamps 22, 24 may be installed using a powder-actuated impact tool, for example. Suitable powder actuated impact tools include the AMPACT™ tool sold by Tyco Electronics Corporation of Pennsylvania. According to some embodiments, the powder actuated impact tool may be constructed and operated as disclosed in U.S. Pat. No. 6,851,262 to Gregory et al., the disclosure of which is incorporated herein by reference.

With the conductor segments of the cable 16 secured to the coupling rods 124 and 134, respectively, by the wedge connectors 22, 24, the retainer mechanisms 129, 139 are each placed in their clamping position by tightening down their respective bolts.

The power line 16 can then be cut between the end members 120, 130 to divide the power line 16 into the two separate conductor cables 12, 14. The cables 12 and 14 are securely coupled to the end member 120 and the end member 130, respectively, by both the wedge connectors 22, 24 and the retainer mechanisms 160 so that the tension from the power line 16 is now applied to the isolating apparatus 100. Depending on the installer's (e.g., utility's) practices, the cut cable ends 12A, 14A can then be bent away from one another as shown in FIGS. 1 and 2 to electrically isolate the cables 12, 14 from one another and/or a section of the power line 16 between the end members 120, 130 can be cut out and removed.

The fuse module 140 may be installed on the hinge assembly 160 and the latch assembly 170 before or after mounting the isolating apparatus 100 on the power line 16 as described above. Generally, the fuse module 140 is pivotably coupled to the hinge bracket 162 for rotation about a transverse pivot axis P-P (FIG. 6) between a closed position as shown in FIGS. 1-3, 6, and 8-10, wherein the fuse module is coupled to the latch bracket 172, and an open position (as shown in dashed line in FIG. 2), wherein the fuse module 140 is swung away from the latch assembly 170 and the end member 130. In the closed position, the fuse module 140 provides electrical continuity through the fuse model 140 (and regulated by the fusible element 144A) between the end members 120 and 130 (more particularly, from the coupling rod 124 to the coupling rod 134). When the fuse module 140 is in the open position, the end members 120, 130 are coupled only by the insulators 110, 112, and are electrically isolated from one another.

Figure 9:
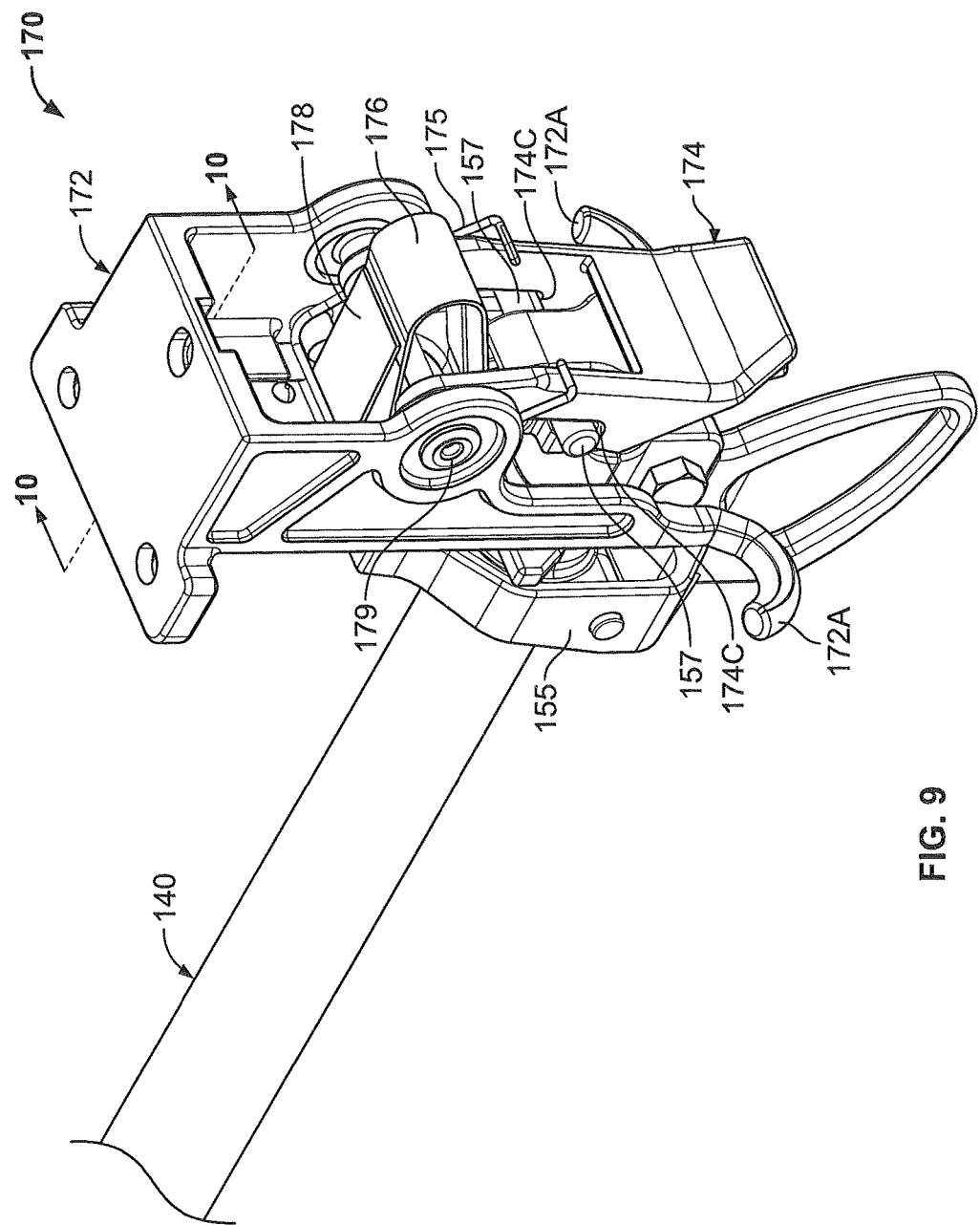
FIG. 9 is a fragmentary, perspective view of the isolating apparatus of FIG. 1 showing a latch bracket assembly forming a part thereof.
Figure 10:
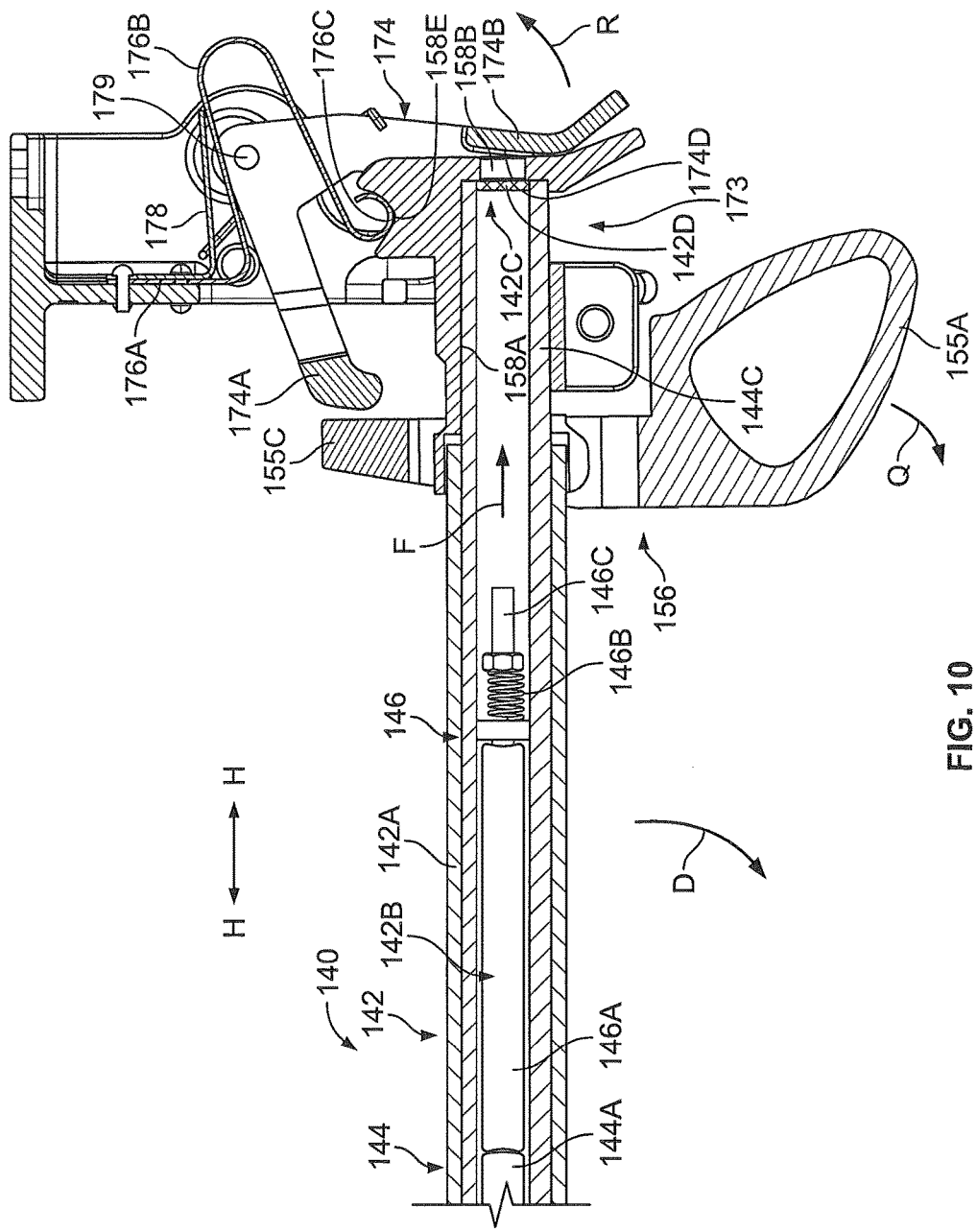
FIG. 10 is a fragmentary, cross-sectional view of the isolating apparatus of FIG. 1 taken along the line 10-10 of FIG. 9.

More particularly, the end fitting 150 is inserted into the central receiver slot 163 and the pivot posts 153 are slid through the side slots 164 until pivot posts 153 seat in the seat sections 164B. The fuse module 140 is then pivoted up so that the end fitting 156 is received in the central slot 173. In doing so, the actuation arm 174B (which is biased toward the fuse module 140 by the spring 175) is deflected in direction R and receives the latch posts 157 in its retention slots 174C, as shown in FIGS. 9 and 10. In this position (the closed position), the contact section 176C of the contact spring 176 is seated in the spring seat 158E of the end fitting 156. At the hinge assembly 160, the fuse module 140 is guided, stabilized and positively positioned by the cooperation of the guide tabs 166, the pivot posts 153 and the seat projections 154.

In the closed position, the contact spring section 176C is persistently biased against the spring seat 158E by the elastic force of the deflected spring 176 and/or the deflected load spring 178. Also, the contact springs 167 are persistently biased against the contact surfaces 154B by the elastic force of the deflected springs 167 and/or the deflected load springs 168.

When it is desired to electrically connect the cables 12, 14, the fuse module 140 can be pivoted (e.g., using a hot stick or load break tool) into the closed position to electrically connect the end members 120, 130 through the fuse module 140. The fuse module 140 can be securely and releasably retained in the closed position by the latch mechanism.

When it is desired to electrically isolate or disconnect the cables 12, 14, the fuse module 140 can be manually unlatched and pivoted into its open position. This may be accomplished by pulling (e.g., using a hot stick or load break tool) the handle feature 155A in a release direction Q (FIG. 10), causing the actuator feature 155C to displace the arm 174A, which in turn pivots the latch arm 174B away from the fuse module 140 in the direction R (FIG. 10). The latch posts 157 are thereby freed from the retention slots 174C and the fuse module 140 is permitted to drop or be pulled down and out of the latch assembly 170 in a direction D. In this manner, electrically contact between the fuse module 140 and the end member 130 is broken.

The isolating apparatus 100 can also operate automatically (i.e., without direct human interaction) to electrically isolate or disconnect the cables 12, 14. In use, upon occurrence of an overcurrent through the fuse module 140 of a prescribed or greater value, the fusible element 144A will blow. Responsive to the blowing of the fusible element 144A, the trigger 146A will cause the drive spring 146B to release and launch the pin 146C in a direction F (FIG. 10) through the bores 142B, 158A, the end openings 142, 158B and the seal 142D and against the strike region 174D of the arm 174B. The momentum of the pin 146C drives the arm 174B to pivot away from the end of the fuse module 140 in the direction R. The latch posts 157 are thereby freed from the retention slots 174C and the fuse module 140 is permitted to drop by force of gravity out of the latch assembly 170. In this manner, electrically contact between the fuse module 140 and the end member 130 is broken. Advantageously, in the open position, the fuse module 140 provides an easily detectable and identifiable visual indication that a fault has occurred and has been interrupted at the isolating apparatus 100.

According to some embodiments and as shown, the lengthwise axis I-I of the power line 16 is substantially horizontally oriented and the isolating apparatus 100 mounted thereon as described, is oriented such that its axis L-L is substantially horizontal and the lengthwise axis M-M (FIG. 5) of the fuse module 140 is substantially horizontal. In the figures, horizontal is indicated as H-H and vertical is indicated as V-V. According to some embodiments, the axes L-L, M-M are within 30 degrees of horizontal H-H and, in some embodiments, within 15 degrees of horizontal H-H.

With reference to FIG. 11, the isolation assembly 5 is shown therein installed in an electrical power distribution system 15 on a power transmission cable 16 between support posts 17.

The isolating apparatus 100 and the in-line isolation assembly 5 can provide significant advantages in installation and service. The isolating apparatus 100 and the in-line isolation assembly 5 can be used to provide fault protection to transformers, overhead lines, underground cables, and capacitor banks, for example.

Many sections of the distribution and transmission network experience current surges during fault conditions. The isolating apparatus 100 allows for the use of fuse protection against these conditions to be positioned anywhere along the power line (e.g., close to the equipment being protected). The isolating apparatus 100 has as an added benefit the capability of being easily spliced into existing circuits that require protection upgrades.

The rigid design of the twin insulator (i.e., elongate insulators 110, 112) frame makes the operation of the fuse switch mechanism 141 more positive with no rotation of the isolating apparatus 100.

According to further embodiments of the present invention, the isolating apparatus 100 can be provided without the retainer mechanisms 129, 139.

According to further embodiments, an in-line isolation apparatus as disclosed herein may be used without one or both of the wedge connectors 22, 24 or with supplemental connectors of other types.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An in-line cable termination system for use with first and second electrical power transmission cables, the conductor termination system comprising:
    an isolating apparatus having an isolating apparatus axis and including:
        an electrically conductive first end member and an electrically conductive second end member spaced apart along the isolating apparatus axis, wherein each of the first and second end members includes a respective coupling portion to mechanically and electrically engage the first and second cables, respectively;
        first and second insulators each extending between and coupling the first end member and the second end member; and
        a fused switch mechanism including a fuse module and configured to selectively alternatively electrically connect the first and second end members, and thereby the first and second cables, through the fuse module and disconnect the first and second end members;
    wherein the isolating apparatus is configured to automatically disconnect the fuse module from the second end member in response to a prescribed overcurrent through the fuse module, and to thereby electrically disconnect the first and second end members; and wherein the fuse module includes an integral fuse actuator mechanism operative to automatically initiate disconnection of the fuse module from the second end member.

2. The in-line cable termination system of claim 1 including:
a first connector adapted to be applied to the first end member and the first cable to securely clamp the first cable to the first end member; and
a second connector adapted to be applied to the second end member and the second cable to securely clamp the second cable to the second end member.

3. The in-line cable termination system of claim 2 wherein each of the first and second connectors includes a wedge connector adapted to be force-applied to the associated first or second end member, the wedge connector including:
a sleeve member defining a sleeve cavity; and
a wedge member configured to be forcibly inserted into the sleeve cavity to capture the associated first or second cable and the associated first or second end member therebetween such that the wedge connector inhibits axial movement of the wedge connector, the cable and the end member.

4. The in-line cable termination system of claim 1 wherein:
the fuse module has a fuse module axis; and
the isolating apparatus is configured such that, when the first and second cables are substantially horizontally extending cables and the isolating apparatus is installed on the first and second cables, the isolating apparatus axis and fuse module axis are substantially horizontally oriented.

5. The in-line cable termination system of claim 1 wherein the isolating apparatus is configured such that, in response to the prescribed overcurrent through the fuse module, the fuse module drops away from the second end member to electrically disconnect the fuse module from the second end member.

6. The in-line cable termination system of claim 5 wherein:
the fuse module has opposed first and second ends;
the isolating apparatus includes a hinge assembly electrically connecting and pivotably coupling the first end of the fuse module to the first end member;
the isolating apparatus includes a latch mechanism electrically connecting and releasably coupling the second end of the fuse module to the second end member; and
when the fuse module drops away from the second end member to electrically disconnect the fuse module from the second end member, the fuse module hangs from the hinge assembly.

7. The in-line cable termination system of claim 1 wherein:
the isolating apparatus includes a latch mechanism electrically connecting and releasably coupling the fuse module to the second end member;
the fuse actuator mechanism includes a projectile and a drive mechanism operative to forcibly displace the projectile; and
in response to the prescribed overcurrent through the fuse module, the drive mechanism forces the projectile to strike the latch mechanism, thereby causing the latch mechanism to release the fuse module to drop away from the second end member to electrically disconnect the fuse module from the second end member.

8. The in-line cable termination system of claim 1 wherein the isolating apparatus is also configured to manually disconnect the fuse module from the second end member to thereby electrically disconnect the first and second end members.

9. The in-line cable termination system of claim 1 including:
a first connector adapted to be applied to the first end member and the first cable to securely clamp the first cable to the first end member; and
a second connector adapted to be applied to the second end member and the second cable to securely clamp the second cable to the second end member; and
wherein:
each of the first and second connectors includes a wedge connector adapted to be force-applied to the associated first or second end member, the wedge connector including:
a sleeve member defining a sleeve cavity; and
a wedge member configured to be forcibly inserted into the sleeve cavity to capture the associated first or second cable and the associated first or second end member therebetween such that the wedge connector inhibits axial movement of the wedge connector, the cable and the end member;
the fuse module has a fuse module axis and opposed first and second ends;
the isolating apparatus is configured such that, when the first and second cables are a substantially horizontally extending cables and the isolating apparatus is installed on the first and second cables, the isolating apparatus axis and fuse module axis are substantially horizontally oriented;
the isolating apparatus includes a hinge assembly electrically connecting and pivotably coupling the first end of the fuse module to the first end member;
the isolating apparatus includes a latch mechanism electrically connecting and releasably coupling the second end of the fuse module to the second end member;
the fuse actuator mechanism includes a projectile and a drive mechanism operative to forcibly displace the projectile;
in response to a prescribed overcurrent through the fuse module, the drive mechanism automatically forces the projectile to strike the latch mechanism, thereby causing the latch mechanism to release the fuse module to drop away from the second end member to electrically disconnect the fuse module from the second end member, and to thereby electrically disconnect the first and second end members;
when the fuse module drops away from the second end member to electrically disconnect the fuse module from the second end member, the fuse module hangs from the hinge assembly; and
the isolating apparatus is also configured to manually disconnect the fuse module from the second end member to thereby electrically disconnect the first and second end members.

10. An in-line cable termination assembly comprising:
first and second electrical power transmission cables; and
an isolating apparatus having an isolating apparatus axis and including:
an electrically conductive first end member and an electrically conductive second end member spaced apart along the isolating apparatus axis, wherein each of the first and second end members includes a respective coupling portion mechanically and electrically engaging the first and second cables, respectively;

first and second insulators each extending between and coupling the first end member and the second end member; and a fused switch mechanism including a fuse module and configured to selectively alternatively electrically connect the first and second end members, and thereby the first and second cables, through the fuse module and disconnect the first and second end members;

wherein the isolating apparatus is configured to automatically disconnect the fuse module from the second end member in response to a prescribed overcurrent through the fuse module, and to thereby electrically disconnect the first and second end members; and wherein the fuse module includes an integral fuse actuator mechanism operative to automatically initiate disconnection of the fuse module from the second end member.

11. The in-line cable termination assembly of claim 10 including:

a first connector mounted on the first end member and the first cable and securely clamping the first cable to the first end member; and a second connector mounted on the second end member and the second cable and securely clamping the second cable to the second end member.

12. The in-line cable termination assembly of claim 11 wherein each of the first and second connectors includes a wedge connector force-applied to the associated first or second end member, the wedge connector including:

a sleeve member defining a sleeve cavity; and a wedge member forcibly inserted into the sleeve cavity and capturing the associated first or second cable and the associated first or second end member therebetween such that the wedge connector inhibits axial movement of the wedge connector, the cable and the end member.

13. The in-line cable termination assembly of claim 10 wherein:

the fuse module has a fuse module axis; and the first and second cables are substantially horizontally extending cables; and the isolating apparatus axis and fuse module axis are substantially horizontally oriented.

14. A method for forming a cable termination assembly with first and second electrical power transmission cables, the method comprising:

providing an isolating apparatus having an isolating apparatus axis and including:

an electrically conductive first end member and an electrically conductive second end member spaced apart along the isolating apparatus axis, wherein each of the first and second end members includes a respective coupling portion to mechanically and electrically engage first and second cables, respectively;

first and second insulators each extending between and coupling the first end member and the second end member; and a fused switch mechanism including a fuse module and configured to selectively alternatively electrically connect the first and second end members, and thereby the first and second cables, through the fuse module and disconnect the first and second end members;

wherein the isolating apparatus is configured to automatically disconnect the fuse module from the second end member in response to a prescribed overcurrent through the fuse module, and to thereby electrically disconnect the first and second end members; and wherein the fuse module includes an integral fuse actuator mechanism operative to automatically initiate disconnection of the fuse module from the second end member;

mechanically and electrically securing the coupling portions of the first and second end members to the first and second cables, respectively; and automatically disconnecting the fuse module from the second end member using the fuse actuator mechanism in response to the prescribed overcurrent through the fuse module to thereby electrically disconnect the first and second end members.

15. The method of claim 14 including:

applying a first connector to the first end member and the first cable to securely clamp the first cable to the first end member; and applying a second connector to the second end member and the second cable to securely clamp the second cable to the second end member.

16. The method of claim 15 wherein:

each of the first and second connectors includes a wedge connector including:

a sleeve member defining a sleeve cavity; and a wedge member;

applying the wedge connector to the end member and the cable includes forcibly inserting the wedge connector into the sleeve cavity using a powder actuated tool to capture the cable and the end member therebetween such that the wedge connector inhibits axial movement of the wedge connector, the cable and the end member.

17. The method of claim 14 wherein:

the fuse module has a fuse module axis; and the first and second cables are a substantially horizontally extending cables; and when the isolating apparatus is installed on the first and second cables, the isolating apparatus axis and fuse module axis are substantially horizontally oriented.

18. The method of claim 14 wherein;

during the step of mechanically and electrically securing the coupling portions of the first and second end members to the first and second cables, the first and second cables form adjacent portions of a continuous power line cable; and the method further includes cutting the power line cable to sever the first and second cables from one another after the step of mechanically and electrically securing the coupling portions of the first and second end members to the first and second cables.

19. The in-line cable termination system of claim 7 wherein, prior to the prescribed overcurrent, the projectile is spaced apart from the latch mechanism.

20. The in-line cable termination assembly of claim 10 wherein:

the isolating apparatus includes a latch mechanism electrically connecting and releasably coupling the fuse module to the second end member;

the fuse actuator mechanism includes a projectile and a drive mechanism operative to forcibly displace the projectile; and in response to the prescribed overcurrent through the fuse module, the drive mechanism forces the projectile to strike the latch mechanism, thereby causing the latch mechanism to release the fuse module to drop away from the second end member to electrically disconnect the fuse module from the second end member.

21. The in-line cable termination assembly of claim 20 wherein, prior to the prescribed overcurrent, the projectile is spaced apart from the latch mechanism.

22. The method of claim 14 wherein:
the isolating apparatus includes a latch mechanism electrically connecting and releasably coupling the fuse module to the second end member;
the fuse actuator mechanism includes a projectile and a drive mechanism operative to forcibly displace the projectile; and
in response to the prescribed overcurrent through the fuse module, the drive mechanism forces the projectile to strike the latch mechanism, thereby causing the latch mechanism to release the fuse module to drop away from the second end member to electrically disconnect the fuse module from the second end member.

23. The method of claim 22 wherein, prior to the prescribed overcurrent, the projectile is spaced apart from the latch mechanism.

\* \* \* \* \*

UNITED STATES PATENT AND TRADEMARK OFFICE
CERTIFICATE OF CORRECTION

PATENT NO. : 9,876,348 B2
APPLICATION NO. : 14/478506
DATED : January 23, 2018
INVENTOR(S) : Rahman et al.

It is certified that error appears in the above-identified patent and that said Letters Patent is hereby corrected as shown below:

In the Specification

Column 6, Line 37: Please correct "1740" to read -- 174D --

Signed and Sealed this
Fifteenth Day of May, 2018

Andrei Iancu
*Director of the United States Patent and Trademark Office*